(12) United States Patent
McKenna

(10) Patent No.: US 11,255,447 B1
(45) Date of Patent: Feb. 22, 2022

(54) PINCH VALVE

(71) Applicant: Flowtech International Limited, Newtownabbey (GB)

(72) Inventor: Jason McKenna, Holywood (GB)

(73) Assignee: Flowtech International Limited, Newtownabbey (GB)

( * ) Notice: Subject to any disclaimer, the term of this patent is extended or adjusted under 35 U.S.C. 154(b) by 0 days.

(21) Appl. No.: 17/406,820

(22) Filed: Aug. 19, 2021

(30) Foreign Application Priority Data

Aug. 19, 2020 (GB) .................................... 2012945

(51) Int. Cl.
*F16K 7/06* (2006.01)

(52) U.S. Cl.
CPC ...................... *F16K 7/06* (2013.01)

(58) Field of Classification Search
CPC ...................... F16K 7/06; F16K 7/07
USPC ...................................................... 251/6, 7
See application file for complete search history.

(56) References Cited

U.S. PATENT DOCUMENTS

| | | | | |
|---|---|---|---|---|
| 3,012,701 A * | 12/1961 | Weber | ................. | G01F 11/088 222/449 |
| 3,250,130 A * | 5/1966 | Martinez | ............. | B01L 3/0293 73/864.34 |
| 3,491,983 A * | 1/1970 | Damme | ................. | F16K 7/06 251/5 |
| 3,982,724 A * | 9/1976 | Citrin | ................. | F16K 7/06 251/7 |
| 4,518,145 A * | 5/1985 | Keltz | ................. | F16K 7/06 251/5 |
| 4,635,897 A * | 1/1987 | Gallant | ............... | F16K 7/06 137/375 |
| 7,246,786 B1 * | 7/2007 | Schmidt | ............. | F16K 7/065 137/347 |
| 2019/0107212 A1 | 4/2019 | Paavola | | |

FOREIGN PATENT DOCUMENTS

WO 2015155661 10/2015

OTHER PUBLICATIONS

UK Search Report of corresponding Application No. GB2012945.8, dated Jan. 14, 2021.

* cited by examiner

*Primary Examiner* — Umashankar Venkatesan
(74) *Attorney, Agent, or Firm* — Gardner, Linn, Burkhart & Ondersma LLP

(57) ABSTRACT

A pinch valve assembly includes a valve body having axially-aligned inlet and outlet ports, a flexible sleeve that is releasably mounted within the valve body, a mechanical pinching mechanism, and a valve casing. The flexible sleeve has a longitudinal bore defining a fluid flow path between the inlet port and the outlet port. The pinching mechanism pinches the flexible sleeve to thereby reduce the effective cross-sectional flow area thereof. The valve casing assembly substantially encloses the valve housing. The valve casing assembly includes at least one removable portion to permit access to the valve housing and the flexible sleeve, to facilitate replacement of the flexible sleeve.

13 Claims, 4 Drawing Sheets

PINCH VALVE

FIELD OF THE INVENTION

This invention relates to an improved pinch valve.

BACKGROUND OF THE INVENTION

Pinch valves typically comprise a valve body within which is mounted a resilient sleeve having a longitudinal bore defining a fluid flow path between an inlet port through which a flowable medium, such as a particulate material, may enter the sleeve, and an outlet port through which the fluid or slurry that enters the sleeve may exit the sleeve. The valve may be closed by deforming opposite side walls of the sleeve into contact with one another to close or at least restrict the fluid flow path defined by the sleeve.

The deformation of the sleeve to a closed configuration may be caused by a pneumatic or a hydraulic system that controls a pressure that a fluid exerts on the exterior of the sleeve to decrease an operating cross-section of the flow path defined by the sleeve. Alternatively, the deformation may be caused by a mechanical system that includes at last one actuating member moveable between a retracted position and an extended position to bring a "pinching head" to bear on an exterior surface of the sleeve against a fixed anvil member or a further extendable pinching head to thereby decrease the operating cross-section of the flow path defined by the sleeve and thereby close the pinch valve.

In a normally closed pinch valve the (or each) actuating member may be biased towards its extended position to close the pinch valve, for example under the action of a respective spring or fluid pressure, to maintain the sleeve in its deformed closed configuration, and a respective actuator may be provided to selectively retract the (or each) actuating member to open the valve.

The sleeve is typically secured within the valve body by retaining mechanisms on each end of the sleeve to permit replacement of the sleeve when worn, particularly where the pinch valve is used to control the flow of a relatively abrasive media.

Pinch valves typically have a relatively simple construction and are easy to operate. Generally, only the pinch valve's sleeve inlet and outlet ports come into contact with the flowable medium whose flow the pinch valve controls, and the resilient material from which the pinch valve sleeve is formed may be tailored so that the sleeve does not interact with the medium.

However, the servicing of known pinch valves, and in particular the replacement of the sleeve, can be problematic and time consuming.

SUMMARY OF THE INVENTION

According to aspects of the present invention, there is provided a pinch valve assembly having a valve body, a flexible sleeve, a mechanical pinching mechanism, and a valve casing assembly. The valve body has axially-aligned inlet and outlet ports, and the flexible sleeve is releasably mounted within the valve body. The flexible sleeve has a longitudinal bore defining a fluid flow path between the inlet port and the outlet port. The mechanical pinching mechanism is operable to pinch the flexible sleeve and thereby reduce the effective cross-sectional flow area of the sleeve. The valve casing assembly substantially encloses the valve housing and includes at least one removable portion to permit access to the valve housing and the flexible sleeve, to facilitate replacement of the flexible sleeve.

In one form, the mechanical pinching mechanism is configured so that the valve is normally closed.

The valve casing assembly may include a first end plate through which one of the inlet and outlet ports extends, a second end plate through which the other of the inlet and outlet ports extends and a tubular casing sandwiched between the first and second end plates, and retainer or retaining means to retain the first and second ends plates onto opposite ends of the tubular casing, whereby the retainer can be released to permit removal of at least one of the first and second end plates from the tubular casing to facilitate replacement of the flexible sleeve. The retainer may include threaded fasteners, such as nuts and bolts, extending between the first and second end plates. The threaded fasteners may extend through the tubular casing.

Optionally, the valve body includes a first part incorporating one of the inlet and outlet ports and the mechanical pinching mechanism and a second part, separable from the first part, the second part incorporating the other of the inlet and outlet ports, wherein the second part of the valve body is separable from the first part to facilitate removal of the flexible sleeve from the valve body.

The flexible sleeve may be supported within a longitudinal bore within the valve body extending between the inlet and outlet ports. In one embodiment the mechanical pinching mechanism may include at least one plunger mounted within the valve body to be moveable between a retracted position in which the pinch valve is in an open configuration, and an extended position in which a distal end of the plunger engages and deforms the flexible sleeve to close or at least restrict the fluid flow path defined by the sleeve. Optionally, the mechanical pinching mechanism may include a pair of opposed plungers mounted diametrically opposite to one another and perpendicular to the fluid flow path defined by the flexible sleeve within the valve body.

The (or each) plunger may be biased towards its extended position by a respective biasing device, such as a compression spring, preferably acting between the respective plunger and an end cap secured to the valve body, whereby removal of the respective end cap from the valve body may permit removal of the respective spring and the respective plunger from the valve body.

The (or each) plunger may include a piston portion slidably mounted within a respective cylinder within the valve body and adapted to be selectively coupled to a supply of pressurised fluid to act against the piston portion of the respective plunger and urge the respective plunger towards its retracted position to bring the pinch valve to its open configuration. The plunger(s) may include a transversely extending pin coupled to the distal end of the plunger, the pin acting on the flexible sleeve when the plunger is moved to its extended position. The pin of the (or each) plunger may serve to retain the plunger within its respective cylinder removal of the pin being required prior to removal of the plunger from the valve body. The valve body may include an access cover removable to facilitate removal of the respective pin or the plunger(s) to facilitate removal of the respective plunger.

These and other objects, advantages, purposes and features of the present invention will become apparent upon review of the following specification in conjunction with the drawings.

BRIEF DESCRIPTION OF THE DRAWINGS

A pinch valve in accordance with an embodiment of the present invention will now be described, by way of example only, with reference to the accompanying drawings, in which.

DETAILED DESCRIPTION OF THE DRAWINGS

Figure 2:
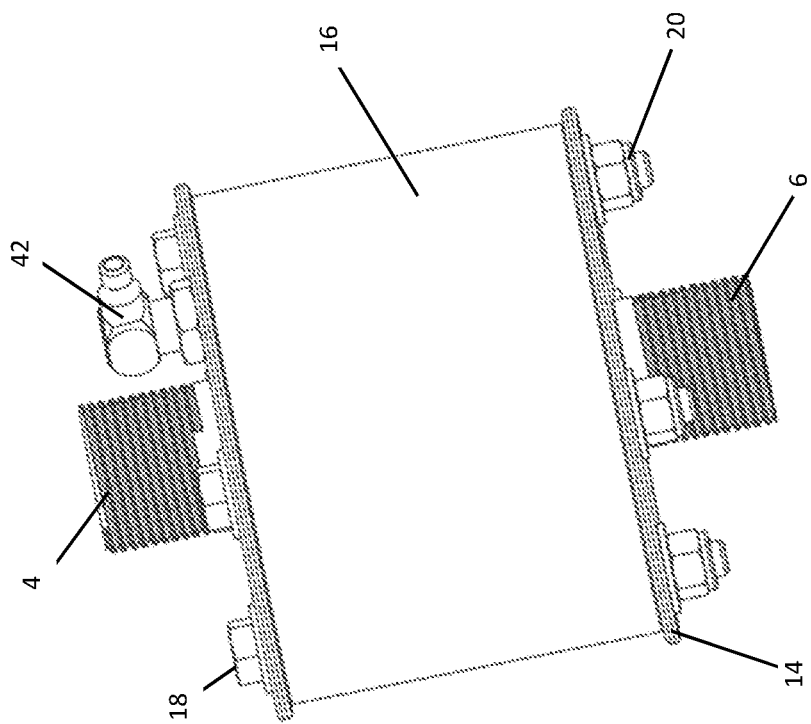
FIG. 2 is a side view of the pinch valve of FIG. 1.
Figure 1:
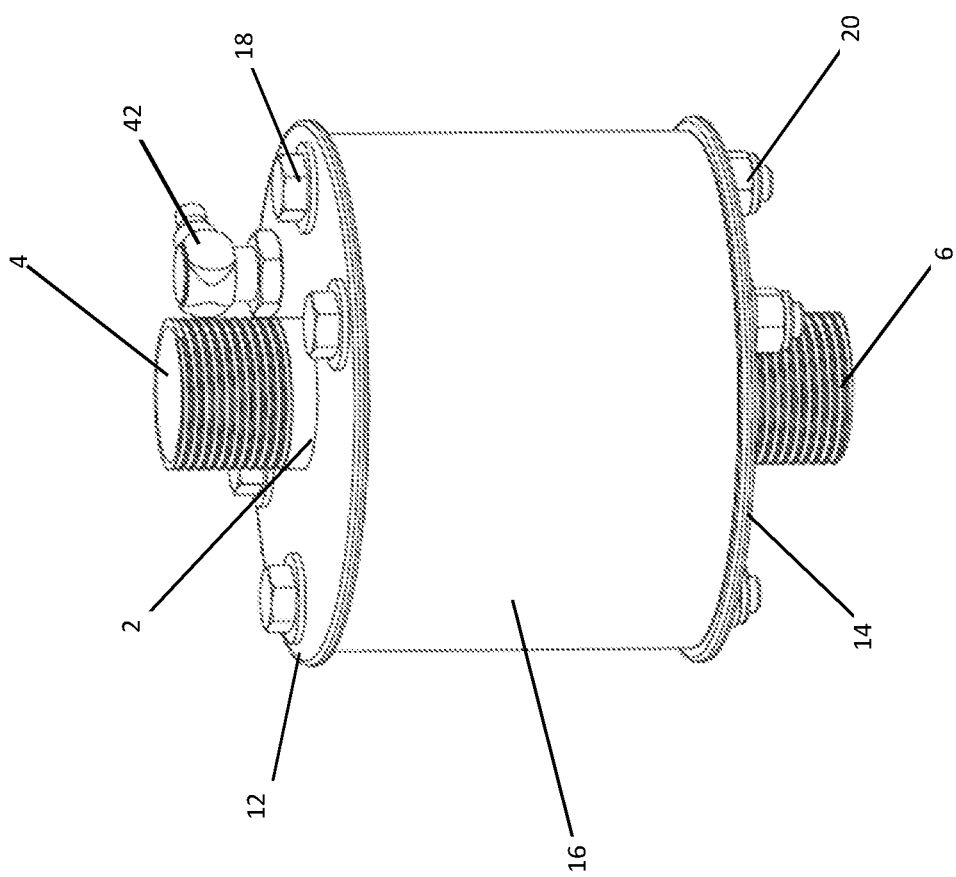
—FIG. 1 is a perspective view of a pinch valve in accordance with the present invention.
Figure 3:
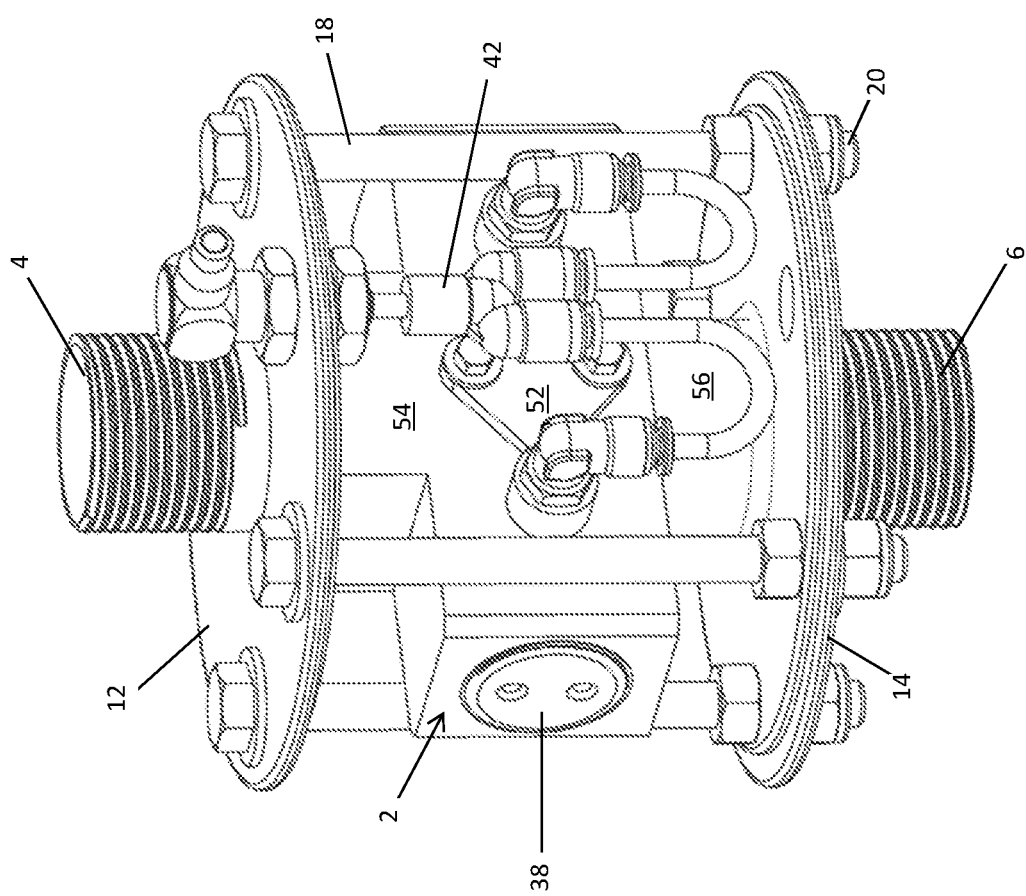
FIG. 3 is a perspective view of the pinch valve of FIG. 1 with the outer casing removed.

As illustrated in the accompanying drawings, a pinch valve in accordance with an embodiment of the present invention includes a valve body 2 having axially aligned inlet and outlet ports 4,6 and a through bore 8 within which is supported a flexible sleeve releasably mounted within the valve body 2 and having a longitudinal bore defining a fluid flow path between the inlet port and the outlet ports 6,8.

The valve body 2 is mounted within a valve casing assembly including a first end plate 12 through which the inlet port 4 extends, a second end plate 14 through which the outlet port 6 extends (or vice versa) and a tubular outer casing 16 sandwiched between the first and second end plates 12,14. Retaining bolts 18 extend through apertures in the end plates 12,14 and extend through the outer casing 16 to engage cooperating nuts 20 to retain the first and second ends plates 12,16 onto opposite ends of the outer casing 16, whereby the nuts 20 can be removed to permit removal of at least one of the first and second end plates 12,14 from the outer casing 16 to facilitate replacement of the flexible sleeve 10 from the valve body 2 and to permit maintenance of the pinch valve, as will be described below in more detail.

A mechanical pinching mechanism is provided within the valve body 2 for pinching the flexible sleeve 10 and thereby reducing the effective cross-sectional flow area thereof to close the pinch valve. Optionally, the pinch valve is of the normally-closed type.

Figure 6:
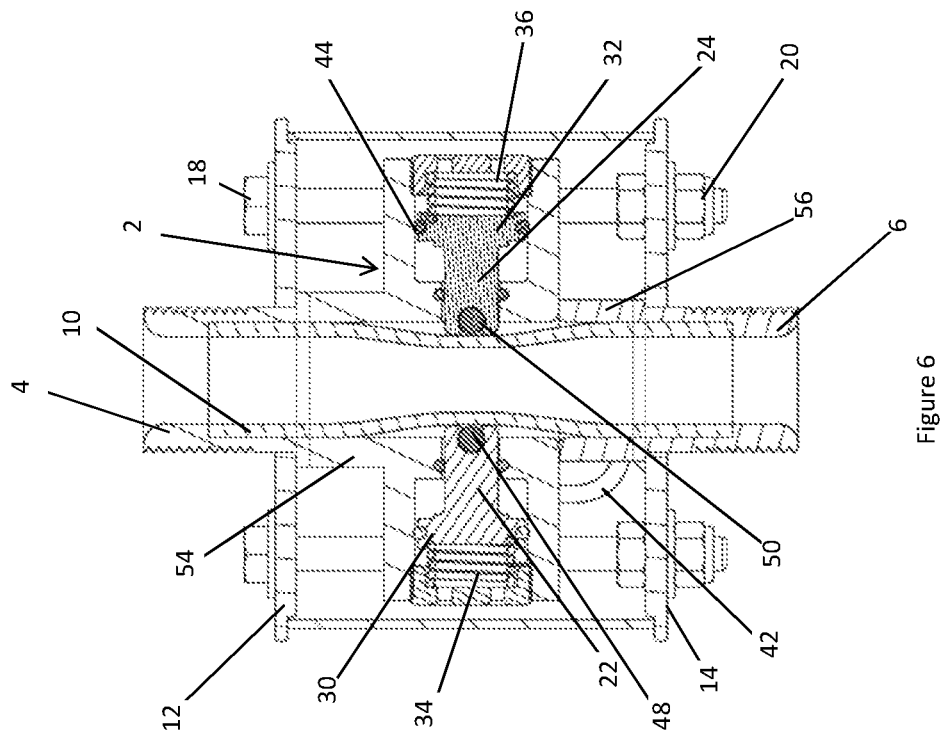
FIG. 6 is a sectional view of the pinch valve of FIG. 1 with the valve in an open configuration.
Figure 5:
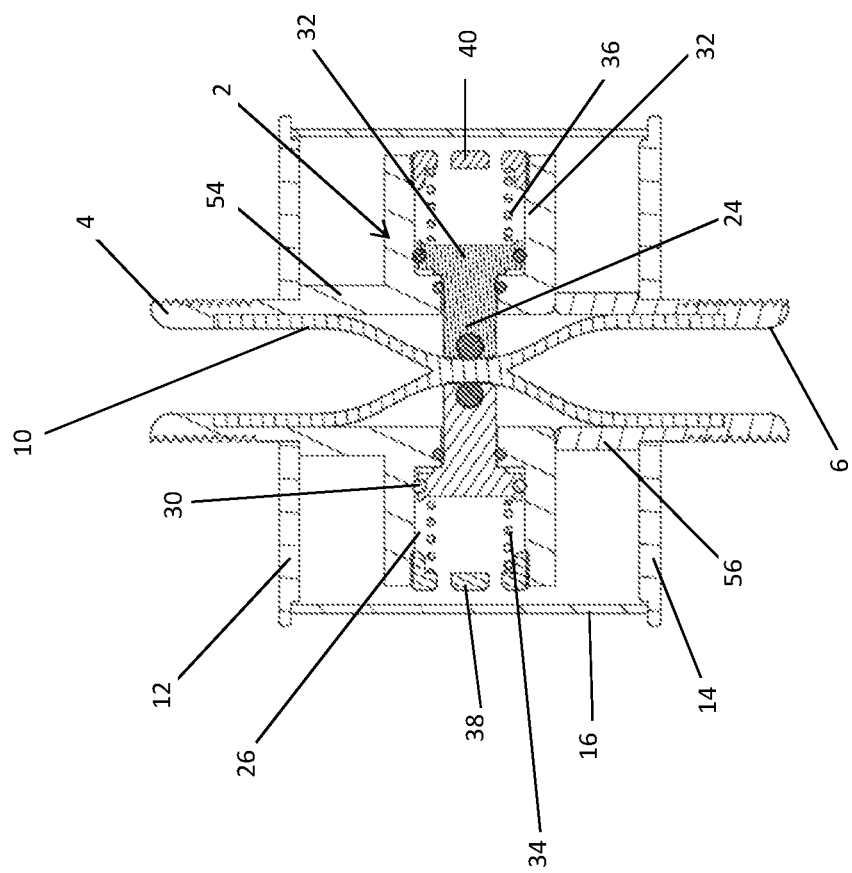
FIG. 5 is a sectional view of the pinch valve of FIG. 1 with the valve in a normally closed configuration.

In the embodiment shown in the drawings, the mechanical pinching mechanism includes a pair of diametrically opposed plungers 22,24 mounted opposite to one another within respective axially aligned cylindrical receiving bores 26,28 in the valve body 2 to be moveable perpendicular to the longitudinal bore defined by the flexible sleeve 10 between retracted positions (shown in FIG. 6), wherein the pinch valve is in an open configuration, and extended positions (shown in FIG. 5), wherein distal ends of the plungers 22,24 extend into the through bore 8 of the valve body 2 and engage and deform the flexible sleeve 10 to close or at least restrict the fluid flow path defined by the sleeve 10.

Each plunger 22,24 includes a piston portion 30,32 slidably mounted within its respective cylindrical receiving bore 26,28 within the valve body 2. A compression spring 34,36 is mounted in each receiving bore to act upon the respective plunger 22,24 therein to bias the plungers 22,24 to their extended positions. A respective threaded cap 38,40 is inserted into an outer end of each receiving bore 26,28 against which outer ends of the springs 34,36 act, the caps 38,40 being removable from the valve body 2 to permit removal of the springs 34,36 and plungers 22,24.

Each receiving bore 26,28 of the valve body 2 is adapted to be selectively coupled to a supply of pressurised fluid, via suitable fluid supply lines 42, such that compressed air or hydraulic fluid can be supplied into the receiving bores 26,28 to act against the piston portion 30,32 of each plunger 22,24 to urge the plungers 22,24 towards their retracted positions, against the respective springs 34,36, to selectively bring the pinch valve to its open configuration.

A suitable seal, such as an O-ring 44, may be mounted in a peripheral groove of the piston portion 30,32 of each plunger 22,24 to form a seal against the walls of the respective receiving bore 26,28 and a further seal, each as a further O-ring 46, may be provided within a receiving groove of a reduced diameter aperture in an inner end of each receiving bore 26,28 through which the distal end of the respective plunger 22,24 extends.

Each plunger 22,24 includes a transversely extending pin 48,50 coupled to the distal end of the respective plunger 22,24, for example extending through a hole 22a,24a in a distal end of the respective plunger 22,24, such that the pins 48,50 act on the sides of the flexible sleeve 10 when the plungers 22,24 are moved towards their extended positions. The pins 48,50 may also serve to retain the plungers 22,24 within their respective receiving bores 26,28, by engaging or seating at respective semi-cylindrical seats 49, 51 at the through bore 8 when the plungers 22,24 are retracted (see FIGS. 4 and 6), and thereby delimiting the retracted positions of the plungers 22,24.

The valve body 2 may include a removable access cover 52 which can be removed to facilitate removal of the pins 48,50 to facilitate removal of the plungers 22,24 from the valve body 2.

Figure 4:
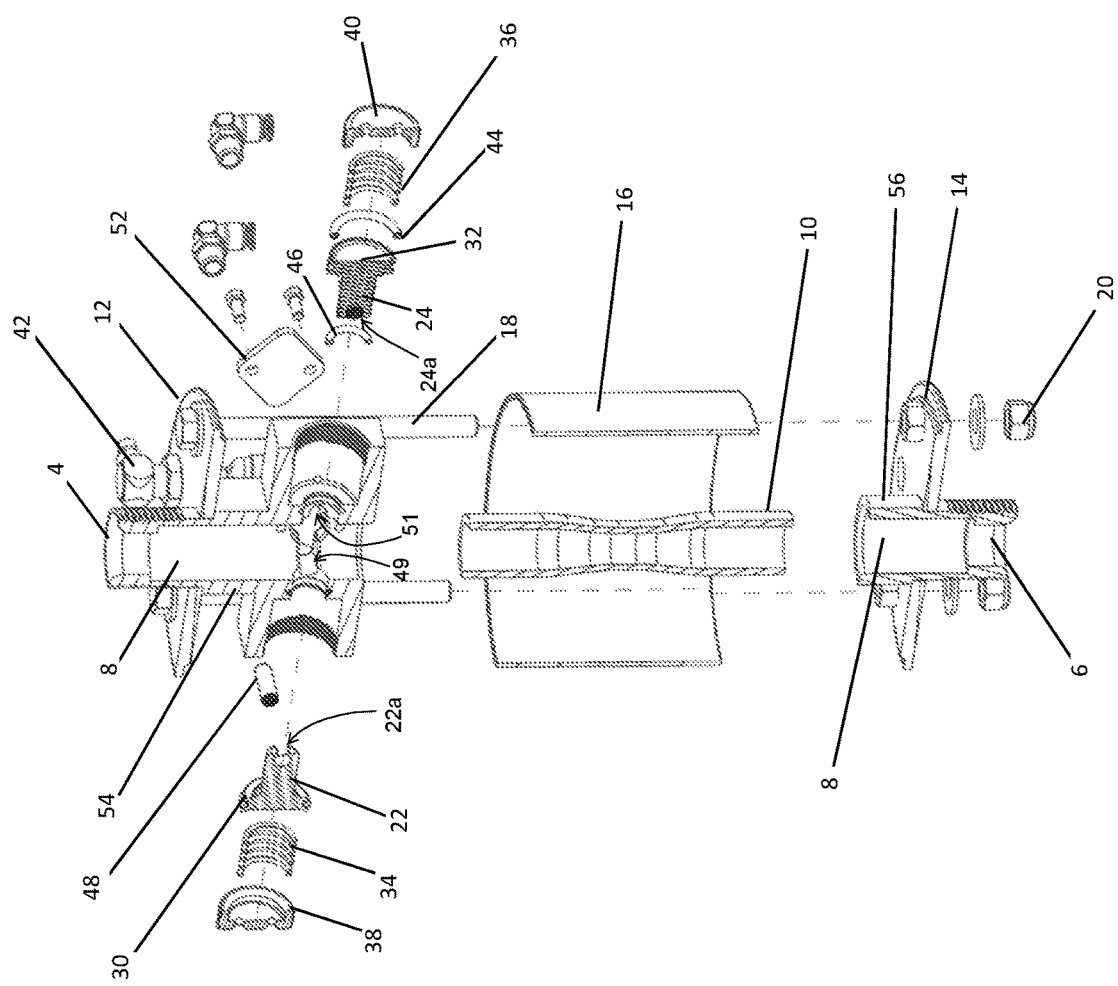
FIG. 4 is a sectional exploded view of the pinch valve of FIG. 1.

The valve body 2 may include a unitary first part 54 incorporating one of the inlet and outlet ports 4,6 and the mechanical pinching mechanism and a unitary second part 56, separable from the first part 54, the second part 56 incorporating the other of the inlet and outlet ports 4,6, wherein the second part 56 of the valve body 2 is separable from the first part 54 to facilitate removal of the flexible sleeve 10 from the valve body 2. As best shown in FIG. 4, the first part 54 of the valve body 2 may incorporate the inlet port 4, a portion of the through bore 8 within which the flexible sleeve 10 is mounted, and the receiving bores 26,28 within which the plungers 22,24 of the mechanical pinching mechanism are mounted. The second part 56 of the valve body incorporates the remainder of the through bore 8 and the outlet port 6.

In order to remove the sleeve 10 for replacement or repair, the plungers 22,24 may first be moved to their retracted positions by applying pressurised air or hydraulic fluid to the receiving bores 26,28 and the bolts 20 may be removed, permitting removal of the second end plate 14 and the outer casing 16 and the second part 56 of the valve body 2, after which the sleeve can be easily pulled out of the remaining of the through bore in the first part 54 of the valve body 2.

The first and second parts 54,56 of the valve body may be machined or cast in metal or moulded in a suitable plastic material.

By varying the pressure of the air or other fluid applied to the receiving bores 26,28 of the valve body to act against the piston portions 30,32 of the plungers 22,24 the position of the plungers 22,24 between their extended and retracted positions can be adjusted against the spring pressure of the return springs 34,36 to adjust the operating cross-section of the flow path defined by the sleeve 10 and thereby control the flow rate of material through the pinch valve between the inlet and outlet ports 4,6 thereof.

The invention is not limited to the embodiment described herein but can be amended or modified without departing from the scope of the present invention, which is intended to be limited only by the scope of the appended claims as interpreted according to the principles of patent law including the doctrine of equivalents.

The invention claimed is:

1. A pinch valve assembly comprising:
a valve body having axially aligned inlet and outlet ports;
a flexible sleeve releasably mounted within said valve body and having a longitudinal bore defining a fluid flow path between said inlet port and said outlet port;
a mechanical pinching mechanism for pinching said flexible sleeve and thereby reducing an effective cross-sectional flow area thereof; and
a valve casing assembly substantially enclosing said valve body;
wherein said valve casing assembly comprises at least one removable portion to permit access to said valve housing and said flexible sleeve, to facilitate replacement of said flexible sleeve, said flexible sleeve being supported within a longitudinal bore within said valve body extending between said inlet and outlet ports;
wherein said mechanical pinching mechanism comprises a pair of opposed plungers mounted within said valve body and diametrically opposite to one another and perpendicular to the fluid flow path defined by said flexible sleeve within said valve body, wherein each of said plungers is moveable between a retracted position in which said pinch valve is in an open configuration, and an extended position in which distal ends of said plungers engage and deform said flexible sleeve to close or at least restrict said fluid flow path defined by said sleeve, the plungers each including a piston portion slidably mounted within a respective cylinder within said valve body and adapted to be selectively coupled to a supply of pressurised fluid to act against said piston portions of said plungers and urge said plungers toward their retracted positions to bring said pinch valve to its open configuration; and
wherein each of said plungers includes a transversely extending pin coupled to said distal end of each said plunger, said pins acting on said flexible sleeve when each said plunger is moved to its extended position.

2. The pinch valve as claimed in claim 1, wherein said mechanical pinching mechanism is configured such that said valve is normally closed.

3. The pinch valve as claimed in claim 1, wherein said valve casing assembly comprises:
a first end plate through which one of said inlet and outlet ports extends;
a second end plate through which the other of said inlet and outlet ports extends;
a tubular casing sandwiched between said first and second end plates; and
a retainer to retain said first and second ends plates onto opposite ends of said tubular casing;
wherein said retainer is releasable to permit removal of at least one of said first and second end plates from said tubular casing to facilitate replacement of said flexible sleeve.

4. The pinch valve as claimed in claim 3, wherein said retainer comprises threaded fasteners extending between said first and second end plates.

5. The pinch valve as claimed in claim 4, wherein said threaded fasteners extend through said tubular casing.

6. The pinch valve as claimed in claim 1, wherein said valve body comprises a first part incorporating one of said inlet and outlet ports and said mechanical pinching mechanism and a second part, separable from said first part, said second part incorporating the other of said inlet and outlet ports, wherein said second part of said valve body is separable from said first part to facilitate removal of said flexible sleeve from said valve body.

7. The pinch valve as claimed in claim 1, wherein each said plunger is biased towards its extended position by a respective biasing device.

8. The pinch valve as claimed in claim 7, wherein said respective biasing device comprises a compression spring acting between said respective plunger and an end cap secured to said valve body.

9. A pinch valve as claimed in claim 1, wherein said pin of each said plunger is configured to retain said plunger within its respective cylinder.

10. A pinch valve as claimed in claim 9, wherein said valve body comprises an access cover removable to facilitate removal of said pin or at least one of said plungers.

11. A pinch valve assembly comprising:
a valve body having axially aligned inlet and outlet ports;
a flexible sleeve releasably mounted within said valve body and having a longitudinal bore defining a fluid flow path between said inlet port and said outlet port;
a mechanical pinching mechanism for pinching said flexible sleeve and thereby reducing an effective cross-sectional flow area thereof; and
a valve casing assembly substantially enclosing said valve body;
wherein said valve casing assembly comprises:
at least one removable portion to permit access to said valve housing and said flexible sleeve, to facilitate replacement of said flexible sleeve, said flexible sleeve being supported within a longitudinal bore within said valve body extending between said inlet and outlet ports;
a first end plate through which one of said inlet and outlet ports extends;
a second end plate through which the other of said inlet and outlet ports extends;
a tubular casing sandwiched between said first and second end plates; and
a retainer to retain said first and second ends plates onto opposite ends of said tubular casing, wherein said retainer is releasable to permit removal of at least one of said first and second end plates from said tubular casing to facilitate replacement of said flexible sleeve;
wherein said mechanical pinching mechanism comprises at least one plunger mounted within said valve body and moveable between a retracted position in which said pinch valve is in an open configuration, and an extended position in which a distal end of said plunger engages and deforms said flexible sleeve to close or at least restrict said fluid flow path defined by said sleeve, the at least one plunger including a piston portion slidably mounted within a respective cylinder within said valve body and adapted to be selectively coupled to a supply of pressurised fluid to act against said piston portion of said at least one plunger and urge said at plunger towards its retracted position to bring said pinch valve to its open configuration; and
wherein said at least one plunger includes a transversely extending pin coupled to said distal end of said plunger, said pin acting on said flexible sleeve when said plunger is moved to its extended position.

12. The pinch valve as claimed in claim 11, wherein said retainer comprises threaded fasteners extending between said first and second end plates.

13. The pinch valve as claimed in claim 12, wherein said threaded fasteners extend through said tubular casing.

\* \* \* \* \*